United States Patent
Kosasih et al.

(10) Patent No.: US 10,762,370 B2
(45) Date of Patent: Sep. 1, 2020

(54) MAGNETIC INK CHARACTER RECOGNITION APPARATUS AND METHOD BY THE SAME

(71) Applicant: TOSHIBA TEC KABUSHIKI KAISHA, Shinagawa-ku, Tokyo (JP)

(72) Inventors: Antonius Kosasih, Singapore (SG); Noriyuki Watanabe, Mishima Shizuoka (JP)

(73) Assignee: TOKSHIBA TEC KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 16/210,258

(22) Filed: Dec. 5, 2018

(65) Prior Publication Data

US 2019/0180130 A1    Jun. 13, 2019

(30) Foreign Application Priority Data

Dec. 8, 2017   (JP) .................. 2017-236292

(51) Int. Cl.
*G06K 9/00* (2006.01)
*G06K 9/18* (2006.01)

(52) U.S. Cl.
CPC ......... *G06K 9/186* (2013.01); *G06K 9/00442* (2013.01); *G06K 9/00523* (2013.01); *G06K 9/00536* (2013.01); *G06K 2209/01* (2013.01)

(58) Field of Classification Search
CPC .... G06K 9/186; G06K 2209/01; B41J 11/007

USPC ............. 382/139, 182; 358/498, 3.28, 1.12; 271/265.01
See application file for complete search history.

(56) References Cited

U.S. PATENT DOCUMENTS

| | | | | |
|---|---|---|---|---|
| 2011/0033111 | A1* | 2/2011 | Fujikawa ............... | G06K 13/16 382/182 |
| 2015/0370210 | A1* | 12/2015 | Wang .................... | G03G 15/60 382/139 |

FOREIGN PATENT DOCUMENTS

JP    2012-221337    11/2012

* cited by examiner

*Primary Examiner* — Kiet M Doan
(74) *Attorney, Agent, or Firm* — Amin, Turocy & Watson, LLP

(57) ABSTRACT

In accordance with an embodiment, a magnetic ink character recognition apparatus comprises a magnetic head; a conveyance module configured to relatively convey a medium on which a magnetic ink character is printed with respect to the magnetic head; an acquisition module configured to acquire a magnetic detection signal of the medium read by the magnetic head; an excluding module configured to exclude a predetermined exclusion section including a reading result of an end portion of the medium from a signal section of the magnetic detection signal; and a recognition module configured to recognize the magnetic ink character based on the magnetic detection signal of the remaining signal section except for the exclusion section.

14 Claims, 5 Drawing Sheets

MAGNETIZATION DIRECTION

READING DIRECTION

MAGNETIC INK CHARACTER RECOGNITION APPARATUS AND METHOD BY THE SAME

CROSS-REFERENCE TO RELATED APPLICATION

This application is based upon and claims the benefit of priority from Japanese Patent Application No. 2017-236292, filed in Dec. 8, 2017, the entire contents of which are incorporated herein by reference.

FIELD

Embodiments described herein relate generally to a magnetic ink character recognition apparatus and method by the same.

BACKGROUND

A conventional magnetic ink character recognition apparatus such as a MICR (Magnetic Ink Character Reader) reads magnetic ink characters printed on a paper using a magnetic head. For example, a magnetic ink character recognition apparatus of a paper conveyance system reads the magnetic ink characters printed on the paper using the magnetic head while conveying the paper, and recognizes the magnetic ink characters based on a magnetic detection signal output from the magnetic head. Such a magnetic detection signal is represented by two-dimensional waveform data reflected in a time axis and a voltage axis, and each character is recognized by comparing it with waveform data standardized according to ISO (International Standards Organization) 1004 or the like.

In the magnetic ink character recognition apparatus, magnetic noise is removed from the magnetic detection signal to improve a recognition rate of the magnetic ink characters. For example, conventionally, in order to remove the magnetic noise caused by a conveyance motor, a technology has been proposed to deduct the magnetic noise caused by the conveyance motor, a photosensor, or the like from the magnetic detection signal at the time of detecting the magnetic ink characters.

In the magnetic ink character recognition apparatus, in order to improve processing speeds, the conveyance speed of the paper is increased. However, if the conveyance speed is increased, there is a possibility that paper bending occurs at an end portion of the paper when the paper is read by the magnetic head. Paper bending causes magnetic noise (hereinafter, referred to as "end noise") and causes deterioration in the character recognition rate. In the above-described conventional noise removing technology, no countermeasure is taken for the end noise and it is therefore difficult to solve the above problem.

DETAILED DESCRIPTION

In accordance with an embodiment, a magnetic ink character recognition apparatus comprises a magnetic head; a conveyance module configured to relatively convey a medium on which a magnetic ink character is printed with respect to the magnetic head; an acquisition module configured to acquire a magnetic detection signal of the medium read by the magnetic head; an excluding module configured to exclude a predetermined exclusion section including a reading result of an end portion of the medium from a signal section of the magnetic detection signal; and a recognition module configured to recognize the magnetic ink character based on the magnetic detection signal of the remaining signal section except for the exclusion section.

Embodiments of a magnetic ink character recognition apparatus and a method by the same according to the present invention is described in detail below with reference to the accompanying drawings.

Figure 1:
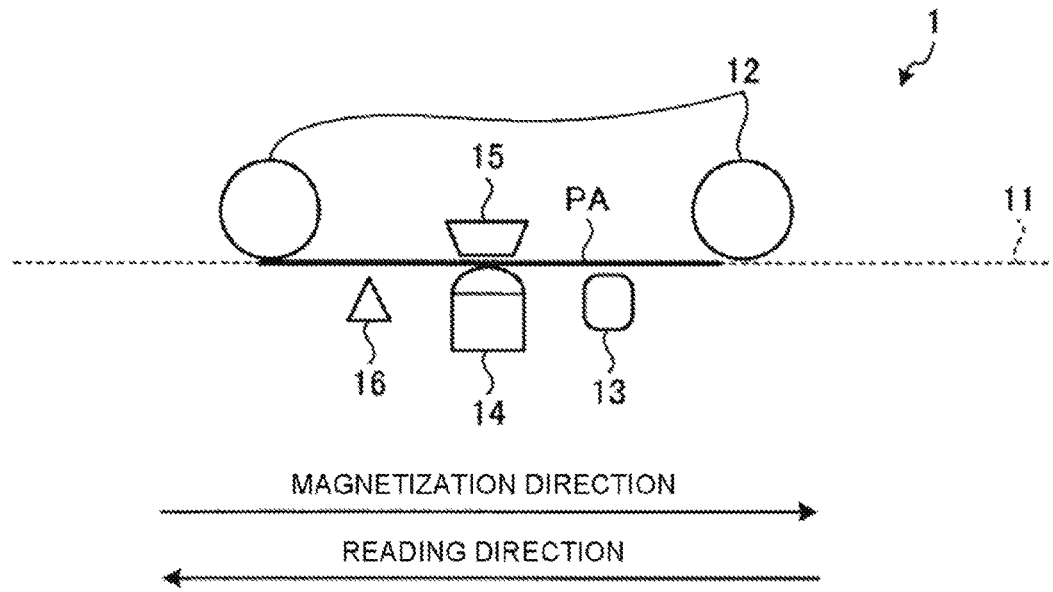
FIG. 1 is a diagram illustrating a schematic configuration of a magnetic ink character recognition apparatus according to an embodiment.

FIG. 1 is a diagram illustrating a schematic configuration of a magnetic ink character recognition apparatus. As shown in FIG. 1, the magnetic ink character recognition apparatus 1 includes a paper conveyance path 11, a conveyance roller 12, a magnetization magnet 13, a magnetic head 14, a paper presser 15 and a paper sensor 16.

The paper conveyance path 11 is used for conveying a paper PA. The paper PA is a medium (paper sheet) such as a check or a promissory note, and a magnetic ink character MC (refer to FIG. 2) is printed on a surface thereof.

Figure 2:
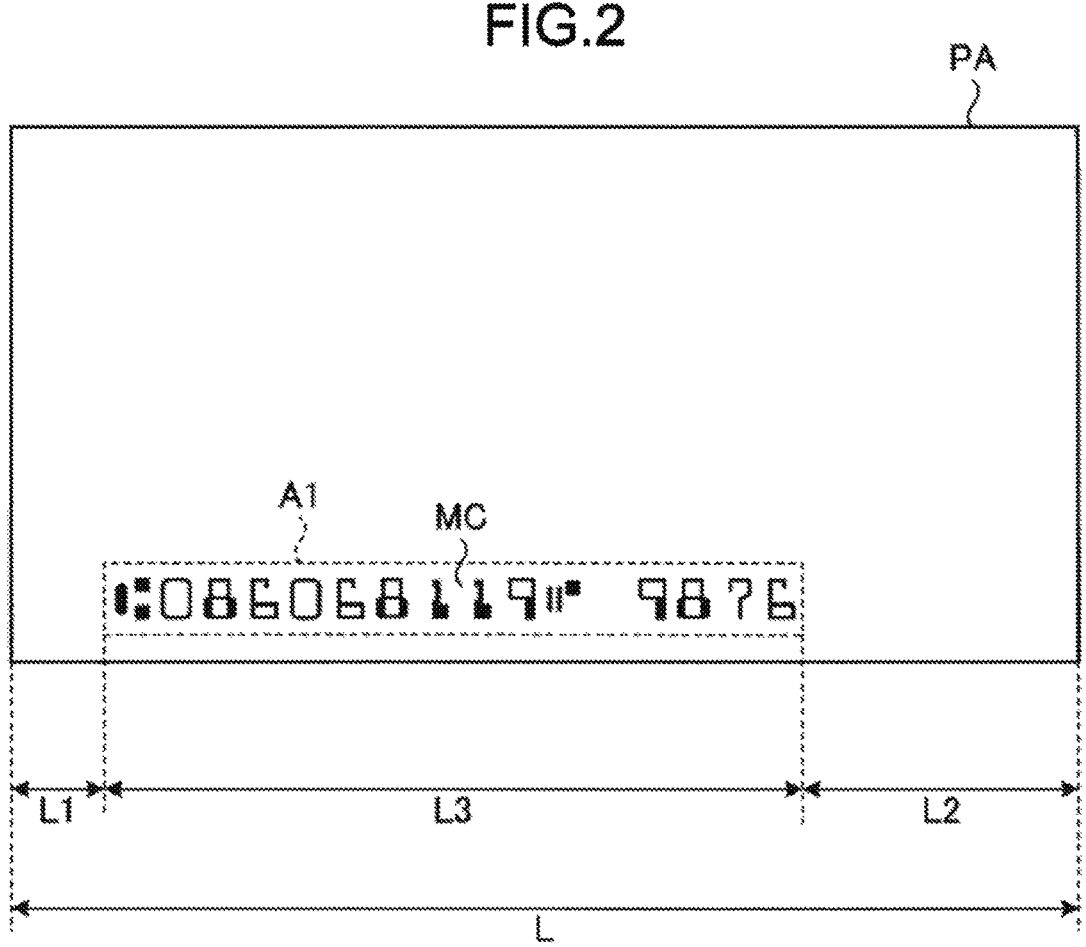
FIG. 2 is a diagram illustrating an example of a paper according to the embodiment.

FIG. 2 is a diagram illustrating an example of the paper PA. As shown in FIG. 2, the magnetic ink character MC is printed on the surface of the paper PA. The magnetic ink character MC is printed in a font conforming to a standard such as E-13B, CMC-7 or the like. For example, in the check or the promissory note, an area (hereinafter, referred to as a printing area) A1 where the magnetic ink character MC is printed is determined in advance, and information such as a check number is printed in the printing area A1. In FIG. 2, the printing area A1 having a length L3 is provided between a position away from a left end of the paper PA by a length L1 and a position away from a right end of the paper PA by a length L2 at the lower part of the paper PA. The paper PA is inserted to the paper conveyance path 11 from the right end side thereof shown in FIG. 2. Specifically, the length L obtained by adding L1, L2 and L3 corresponds to a paper length (size) in a conveyance direction of the paper PA.

Returning to FIG. 1, the conveyance roller 12 conveys the paper PA inserted to the paper conveyance path 11 to the right or to the left. The magnetization magnet 13 is, for example, an electromagnet, and magnetizes the magnetic ink character MC printed on the surface of the paper PA. The magnetic head 14, which is a magnetic detection device that reads a change in magnetism (magnetic field), reads magnetism from the paper PA conveyed in a reading direction. The paper presser 15 is arranged to face the magnetic head 14. The paper presser 15 presses the paper towards the magnetic head with a certain pressure in a reading operation. The paper PA conveyed on the paper conveyance path 11 passes through a gap between the magnetic head 14 and the paper presser 15. The paper sensor 16 is, for example, a photosensor, and detects the paper PA conveyed on the paper conveyance path 11.

In the configuration shown in FIG. 1, the paper PA is inserted from a left end side of the paper conveyance path 11 in such a manner that a surface thereof on which the magnetic ink character MC is printed faces the magnetic head 14. The paper PA inserted from the left end side of the paper conveyance path 11 is conveyed towards the right direction (hereinafter, referred to as "magnetization direction") by conveyance rollers 12. The magnetization magnet 13 generates a magnetic field for magnetizing the magnetic ink character MC for the paper PA conveyed in the magnetization direction. As a result, the magnetic ink character MC printed on the paper PA is magnetized by the magnetization magnet 13.

The paper PA arriving at the right end side of the paper conveyance path 11 is conveyed towards the left direction (hereinafter, referred to as a reading direction) by the conveyance rollers 12. The magnetic head 14 reads magnetism from the paper PA (magnetic ink character MC) during conveyance of the paper PA in the reading direction, and outputs a reading result as a magnetic detection signal. The paper sensor 16 detects the paper PA on the paper conveyance path 11 in the conveyance of the paper PA by the conveyance rollers 12.

The configuration relating to the conveyance of the paper PA is not limited to that shown in FIG. 1. For example, although the paper conveyance path 11 is a straight line in FIG. 1, it is not limited thereto, and the paper conveyance path 11 may be a curve. The magnetization and the reading may be performed during conveyance of the paper in one direction. The mounting positions of the magnetization magnet 13, the magnetic head 14 and the paper sensor 16, and the number of paper sensors 16 are not limited to those shown in FIG. 1.

In FIG. 1, the magnetization magnet 13 is an electromagnet, but it is not limited thereto, and it may be a permanent magnet. If the magnetization is performed by another device, a configuration relating to the magnetization may be removed from the magnetic ink character recognition apparatus 1. In FIG. 1, the magnetic head 14 is fixed and the paper PA is conveyed (moved) to the magnetic head 14. However, it is not limited thereto, the paper PA may be fixed and the magnetic head 14 may be conveyed (removed) to the paper PA.

Figure 3:
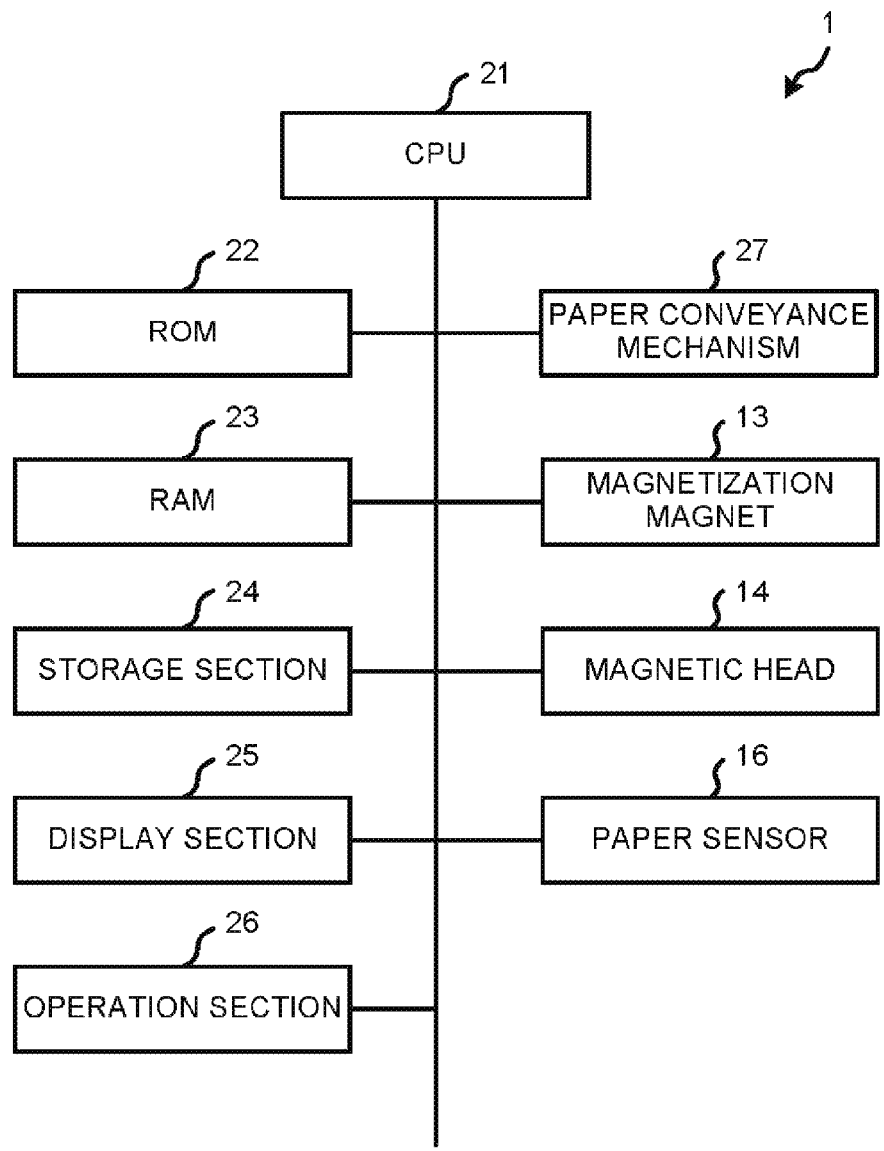
FIG. 3 is a diagram illustrating an example of a hardware configuration of the magnetic ink character recognition apparatus according to the embodiment.

Next, with reference to FIG. 3, a hardware configuration of the magnetic ink character recognition apparatus 1 is described. FIG. 3 is a diagram illustrating an example of the hardware configuration of the magnetic ink character recognition apparatus 1.

As shown in FIG. 3, the magnetic ink character recognition apparatus 1 has a computer structure composed of a CPU (Central Processing Unit) 21, a ROM (Read Only Memory) 22 and a RAM (Random Access Memory) 23, in addition to the magnetization magnet 13, the magnetic head 14 and the paper sensor 16 described above.

The CPU 21 collectively controls the operation of the magnetic ink character recognition apparatus 1 by executing programs stored in the ROM 22. By executing the programs stored in the ROM 22, the CPU 21 realizes each functional section described later.

The ROM 22 stores various programs capable of being executed by the CPU 21 and various setting information relating to the operation of the magnetic ink character recognition apparatus 1. The RAM 23 temporarily stores data and programs when the CPU 21 executes various programs.

The magnetic ink character recognition apparatus 1 includes a storage section 24, a display section 25 and an operation section 26. The storage section 24 is a readable/writable nonvolatile memory such as an HDD (Hard Disk Drive) or a flash memory. The storage section 24 stores various programs capable of being executed by the CPU 21 and various setting information relating to the operation of the magnetic ink character recognition apparatus 1.

For example, the storage section 24 stores setting information (hereinafter, referred to as an exclusion section) that determines a signal section required to be excluded from the magnetic detection signal read from the paper PA by the magnetic head 14. Here, the exclusion section indicates a signal section including a reading result of a rear end of the paper PA. The exclusion section is preset based on a specification of the paper PA to be used.

Below, the exclusion section is described using the paper PA shown in FIG. 2 as an example. If the paper PA is conveyed from the left end side thereof at the time of conveyance in the reading direction, a peak position corresponding to a left end (tip) of the printing area A1 is detected based on a peak of the magnetic detection signal. If the signal section whose length is equal to the length of the paper is specified using this position as a base point, the reading result of the rear end of the paper PA is included in the latter half of the signal section.

Therefore, if the exclusion section is set with the rear end of the specified signal section as a reference, the exclusion section is set based on sizes (L1, L2) of margin areas positioned on the front and back side in the conveyance direction of the printing area A1 on the paper PA and the conveyance speed of the paper PA. Specifically, the exclusion section can be expressed by a value (time width) obtained by dividing a length X satisfying the condition of "L1<X<L1+L2" by the conveyance speed of the paper PA. Here, it is assumed that the value of X can be adjusted within a range that satisfies the above conditions. By excluding the magnetic detection signal corresponding to the exclusion section (time width) set in that manner from the rear end to the tip of the specified signal section, it is possible to remove the reading result of the rear end of the paper PA.

The setting information stored in the storage section 24 is not limited to the above example. For example, the storage section 24 may store information relating to the specification of the paper PA (for example, lengths L1, L2, etc.) as the setting information, and may dynamically derive the above exclusion section from the setting information and the real-time conveyance speed.

The display section 25 is a display device such as an LCD (Liquid Crystal Display). Under the control of the CPU 21, the display section 25 displays various kinds of information such as a recognition result of the magnetic ink character MC. The operation section 26 is an input device such as an operation switch. The operation section 26 receives an operation by a user and outputs the received operation content to the CPU 21.

The magnetic ink character recognition apparatus 1 also includes a paper conveyance mechanism 27. The paper conveyance mechanism 27 is an example of a conveyance module. The paper conveyance mechanism 27 includes a driving motor for rotating the conveyance roller 12 together with the paper conveyance path 11 and the conveyance roller 12 described above. Under the control of the CPU 21, the paper conveyance mechanism 27 reciprocates the paper PA inserted to the paper conveyance path 11 in the magnetization direction and the reading direction.

Figure 4:
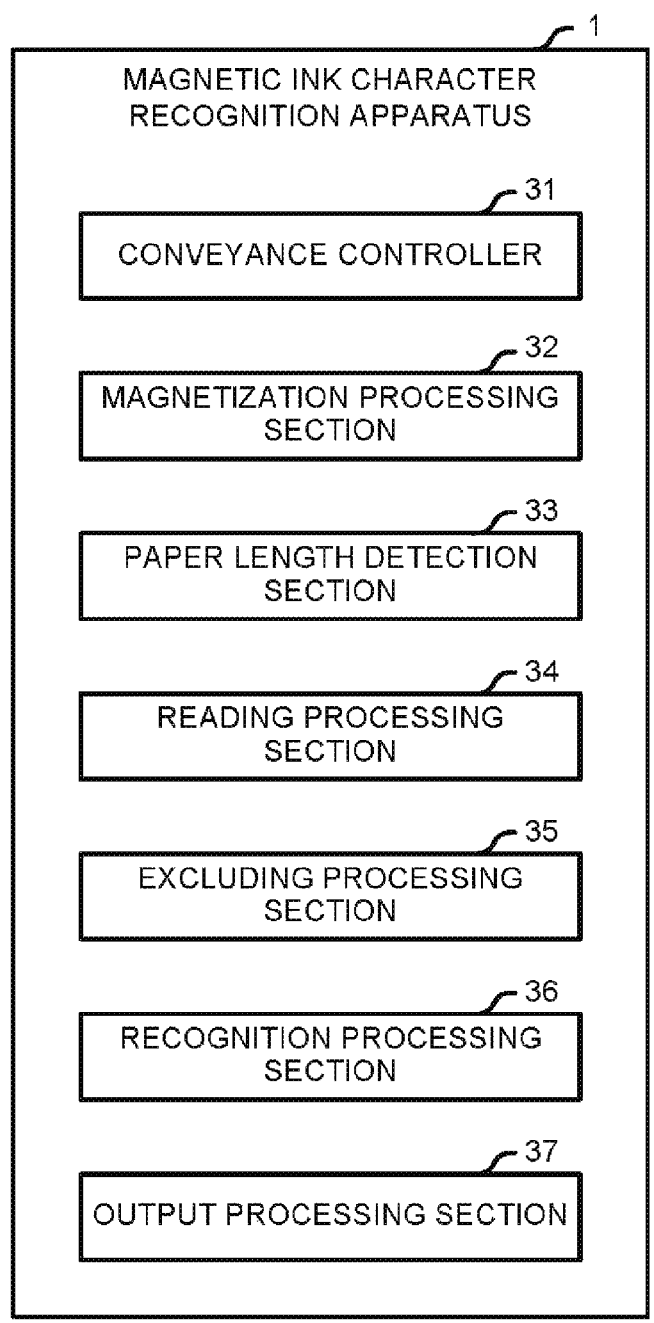
FIG. 4 is a diagram illustrating an example of functional components of the magnetic ink character recognition apparatus according to the embodiment.

Next, the functional component of the magnetic ink character recognition apparatus 1 is described with reference to FIG. 4. FIG. 4 is a diagram illustrating an example of functional components of the magnetic ink character recognition apparatus 1.

As shown in FIG. 4, the magnetic ink character recognition apparatus 1 includes a conveyance controller 31, a magnetization processing section 32, a paper length detection section 33, a reading processing section 34, an excluding processing section 35, a recognition processing section 36 and an output processing section 37 as functional sections. These functional sections may have a software configuration realized by the CPU 21 executing the programs or a hardware configuration realized by a dedicated processor.

The conveyance controller 31 controls conveyance of the paper PA on the paper conveyance path 11 by controlling the paper conveyance mechanism 27. Specifically, if the paper PA is inserted from the left end side of the paper conveyance path 11 shown in FIG. 1, the conveyance controller 31 conveys the paper PA in the magnetization direction. If the paper PA reaches the right end side of the paper conveyance path 11, the conveyance controller 31 conveys the paper PA in the reading direction. The conveyance controller 31 conveys the paper PA at a predetermined conveyance speed.

The magnetization processing section 32 cooperates with the magnetization magnet 13 to execute a magnetization processing for magnetizing the magnetic ink character MC. Specifically, the magnetization processing section 32 operates the magnetization magnet 13 to generate a magnetic field while the paper PA is being conveyed in the magnetization direction under the control of the conveyance controller 31.

The paper length detection section 33 is an example of a detection module. The paper length detection section 33 detects a size (paper length) in the conveyance direction of the paper PA conveyed on the paper conveyance path 11 based on a sensing result of the paper sensor 16. For example, the paper length detection section 33 acquires the paper length of the paper PA by multiplying a length of time in which the paper sensor 16 continuously detects the paper PA with the conveyance speed of the paper PA. In the present embodiment, the paper length detection section 33 detects the paper length during conveyance in the magnetization direction.

The reading processing section 34 is an example of an acquisition module. The reading processing section 34 cooperates with the magnetic head 14 to execute a reading processing of reading a magnetic detection signal from the paper PA (magnetic ink character MC) conveyed on the paper conveyance path 11. Specifically, the reading processing section 34 acquires the magnetic detection signal output from the magnetic head 14 by operating the magnetic head 14 while the paper PA is being conveyed in the reading direction. The magnetic detection signal acquired by the reading processing section 34 is stored in a storage medium such as the RAM 23.

Figure 5:
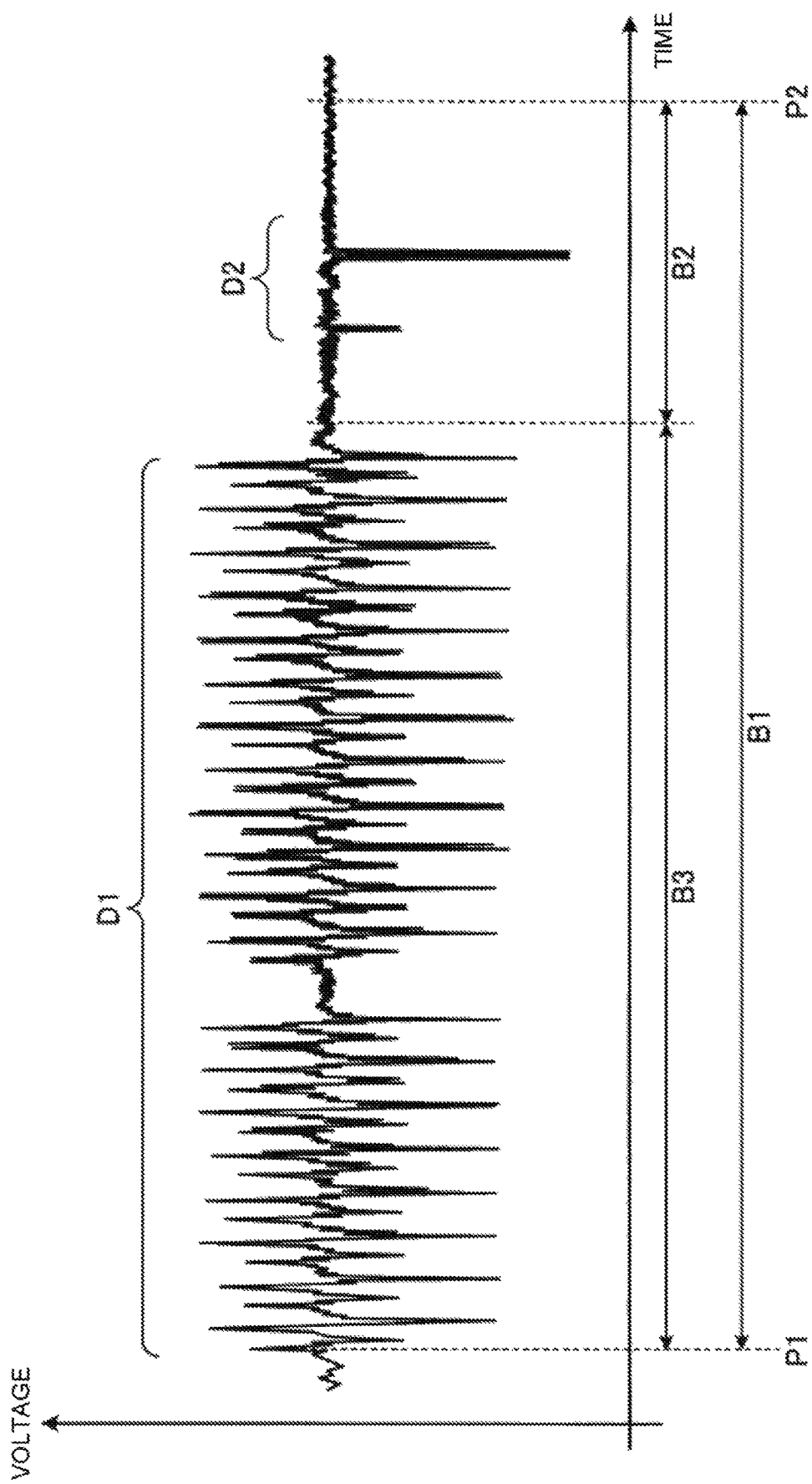
FIG. 5 is a diagram illustrating an example of a magnetic detection signal according to the embodiment.

FIG. 5 is a diagram illustrating an example of a magnetic detection signal. In FIG. 5, a horizontal axis indicates a time axis representing the elapse of time, and a vertical axis indicates a voltage value corresponding to a magnitude of magnetism.

If the magnetic ink character MC is read by the magnetic head 14, a magnetic detection signal having a waveform corresponding to a shape of the magnetic ink character MC is obtained. For example, in the magnetic detection signal in FIG. 5, a waveform D1 corresponds to the magnetic ink character MC.

Meanwhile, in a field of the magnetic ink character recognition such as MICR, in order to improve the processing speed, the conveyance speed of the paper is high. However, if the conveyance speed is increased, there is a possibility that the paper bending occurs in the end portion of the paper PA when the paper PA is read by the magnetic head 14. For example, in the configuration in FIG. 1, there is a possibility that the paper bending occurs at the end portion of the paper PA that enters a gap between the magnetic head 14 and the paper presser 15 when the paper PA moves out of the gap. The paper bending affects the reading operation of the magnetic head 14 and is reflected on the magnetic detection signal as a spike-like magnetic noise (hereinafter, referred to as "end noise") as shown in the waveform D2. In the recognition processing section 36 described later, the magnetic ink character MC is recognized based on the magnetic detection signal. If such end noise is included, erroneous recognition occurs, leading to a decrease in character recognition rate.

Therefore, in the magnetic ink character recognition apparatus 1, the excluding processing section 35 is provided to exclude the end noise from the magnetic detection signal. The excluding processing section 35 is described below.

The excluding processing section 35 is an example of an excluding module. The excluding processing section 35 executes an excluding processing for excluding the end noise from the magnetic detection signal acquired by the reading processing section 34.

Specifically, the excluding processing section 35 detects a first peak position based on an amplitude (voltage value) of the magnetic detection signal. A first peak of the magnetic ink character MC is defined to have a positive output value of a certain level or higher according to a printing standard. The excluding processing section 35 scans the waveform of the magnetic detection signal from the beginning to determine whether or not the voltage value is positive and is equal to or greater than a threshold value. For example, the threshold value is set to a value larger than the amplitude of the magnetic detection signal detected when the paper PA is not conveyed, a value which is 60% of an average value calculated from all the positive peak values, or the like.

Then, the excluding processing section 35 detects the first peak position satisfying the determination condition. For example, in the magnetic detection signal shown in FIG. 5, the excluding processing section 35 detects a first peak position P1 appearing in the magnetic detection signal. The peak position P1 detected in this manner corresponds to the tip of the printing area A1 (magnetic ink character MC) in the conveyance direction of the paper PA.

Next, the excluding processing section 35 specifies a signal section starting from the peak position P1 to a position P2 away from the peak position P1 by a movement distance corresponding to the time width which corresponds to the paper length. The time width is derived, for example, by dividing the paper length by the conveyance speed of the paper PA.

Then, based on the setting information (exclusion section) stored in the storage section 24, the excluding processing section 35 extracts the magnetic detection signal in the remaining signal section excluding the exclusion section from the rear end of the specified signal section as a target signal.

For example, in the magnetic detection signal shown in FIG. 5, the excluding processing section 35 specifies a signal section B1 starting from the first peak position P1 to the position P2 away from the peak position P1 by a movement distance corresponding to the time width which corresponds to the paper length. Next, the excluding processing section 35 excludes the time width of an exclusion section B2 from the rear end (position P2) to the tip of the signal section B1. Then, the excluding processing section 35 extracts the magnetic detection signal in a remaining signal section B3 except for the exclusion section B2 as the target signal.

The target signal extracted in this manner is obtained by removing the reading result of the end of the paper PA from the reading result of the paper PA. Specifically, the excluding processing section 35 excludes (removes) the end noise from the magnetic detection signal of the paper PA acquired by the reading processing section 34, and extracts the remaining magnetic detection signal as the target signal.

The recognition processing section 36 is an example of a recognition module. The recognition processing section 36 recognizes each character of the magnetic ink character MC printed on the paper PA based on the target signal extracted by the excluding processing section 35. Here, a known technology for public use can be used as a recognition method of the magnetic ink character MC. For example, the recognition processing section 36 extracts waveform data indicating each character of the magnetic ink character MC from the target signal and compares it with the waveform data for each character standardized conforming to ISO 1004 or the like to recognize the character based on a similarity degree therebetween.

The output processing section 37 outputs a recognition result of the magnetic ink character MC by the recognition processing section 36 to the display section 25. The output destination of the recognition result is not limited to the display section 25. For example, the output processing section 37 may output (store) the recognition result of the magnetic ink character MC to the storage section 24. The output processing section 37 may output (transmit) the recognition result of the magnetic ink character MC to an external device via a communication device (not shown).

Figure 6:
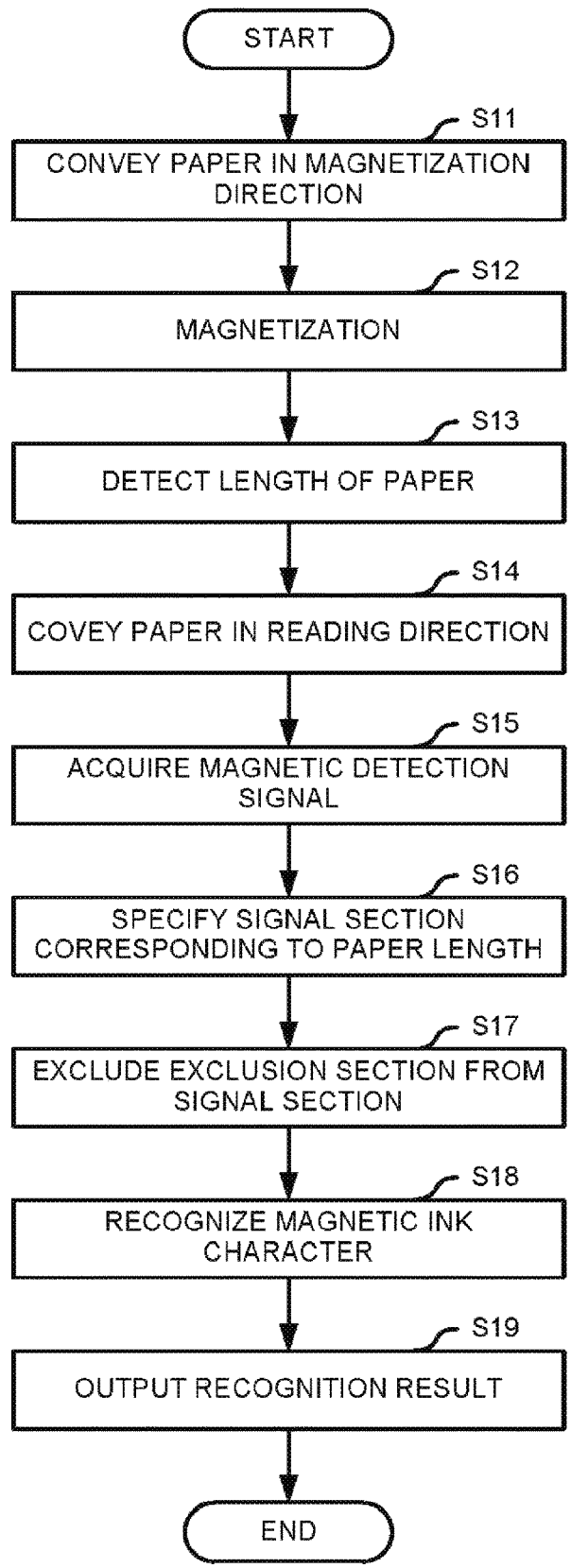
FIG. 6 is a flowchart depicting an example of a character recognition processing performed by the magnetic ink character recognition apparatus according to the embodiment.

The operation of the magnetic ink character recognition apparatus 1 is described below with reference to FIG. 1 and FIG. 6. Here, FIG. 6 is a flowchart depicting an example of a character recognition processing performed by the magnetic ink character recognition apparatus 1.

If the paper PA is inserted from the left side of the paper conveyance path 11 shown in FIG. 1, the conveyance controller 31 conveys the paper PA in the magnetization direction (Act S11). The magnetization processing section 32 operates the magnetization magnet 13 while the paper PA is conveyed in the magnetization direction to magnetize the magnetic ink character MC by generating a magnetic field on the paper conveyance path 11 (Act S12).

The paper length detection section 33 detects the paper length of the paper PA based on the sensing result of the paper PA output from the paper sensor 16 (Act S13).

Next, when the paper PA reaches the right end of the paper conveyance path 11, the conveyance controller 31 conveys the paper PA in the reading direction (Act S14). Here, the magnetization processing section 32 may stop the operation of the magnetization magnet 13 as the conveyance of the paper PA in the reading direction is started.

The reading processing section 34 operates the magnetic head 14 in accordance with the start of the conveyance in the reading direction to acquire the magnetic detection signal read by the magnetic head 14 (Act S15). The acquired magnetic detection signal is temporarily stored in the RAM or the like.

Subsequently, the excluding processing section 35 specifies the signal section starting from the first peak position appearing in the magnetic detection signal to the position away from the peak position by a movement distance corresponding to the time width which corresponds to the paper length (Act S16). Next, the excluding processing section 35 excludes the magnetic detection signal in the exclusion section in a direction from the end of the signal section specified in Act S16 towards the tip thereof, and extracts the magnetic detection signal in the remaining signal section as the target signal (Act S17).

Subsequently, the recognition processing section 36 recognizes the magnetic ink character MC based on the target signal extracted in Act S17 (Act S18). Then, the output processing section 37 outputs the recognition result in Act S18 to the display section 25 (Act S19), and then terminates the processing.

As described above, the magnetic ink character recognition apparatus 1 of the present embodiment excludes the signal section (exclusion section) including the reading result of the end portion of the paper PA from the magnetic detection signal of the paper PA read by the magnetic head 14. Then, the magnetic ink character recognition apparatus 1 recognizes the magnetic ink character MC printed on the paper PA based on the magnetic detection signal from which the magnetic detection signal in the exclusion section is excluded. As a result, the magnetic ink character recognition apparatus 1 can recognize the magnetic ink character MC based on the magnetic detection signal from which the end noise is excluded, thereby improving the character recognition rate.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the above-described embodiment, the paper length of the paper PA is detected by the paper sensor 16, but it is not limited thereto, and the paper length may be obtained by another method. For example, the paper length of the paper PA may be input via the operation section 26. The paper length of the paper PA may be stored in advance in the storage section 24 as the setting information and may be read from the storage section 24.

In the above embodiment, one exclusion section is stored in the storage section 24; however, the number of the exclusion sections to be stored is not particularly limited. For example, the storage section 24 may store the paper length of the paper PA and the exclusion section in an associated manner for each type of the paper PA. Here, the type of the paper PA refers to, for example, the type such as the check, the security, etc., and a value corresponding to the specification of the paper PA of that type is set for the exclusion section. In this case, the excluding processing section 35 reads the exclusion section corresponding to the paper length detected by the paper length detection section 33 from the storage section 24, and extracts the target signal based on the exclusion section.

In the above embodiment, the signal section corresponding to the paper length is specified with the first peak position in the magnetic detection signal as the base point.

However, the position which is the base point is not limited thereto. For example, a position before the first peak position by a distance corresponding to a predetermined time width (for example, a time width corresponding to L1) may be set as the base point. In this case, a value taking into account the above time width is set for the exclusion section. For example, if the position before the first peak position by a movement distance corresponding to a time width corresponding to the length L1 (refer to FIG. 2) is set as the base point, the exclusion section is indicated by a value (time width) calculated by dividing a length X satisfying the condition of "0<X<L2" by the conveyance speed of the paper PA.

In the above embodiment, the exclusion section is excluded with the rear end of the specified signal section as a reference. However, the exclusion section may be excluded with the tip of the signal section as a reference. For example, in the case of the paper PA in FIG. 2, the excluding processing section 35 specifies a signal section corresponding to the time width which corresponds to the length L3 with the first peak position of the magnetic detection signal as the base point, and extracts the magnetic detection signal in the signal section as the target signal. Since the target signal extracted in this way is the reading result corresponding to the printing area A1, the reading result of the end portion of the paper PA, i.e., the end noise is removed. The storage section 24 previously stores a value (time width) obtained by dividing the length L3 of the printing area A1 by the conveyance speed of the paper PA as the setting information (extraction section).

The program to be executed by the magnetic ink character recognition apparatus 1 of the above embodiment may be provided by recording in a file in an installable format or an executable format in a computer-readable recording medium, such as a floppy (registered trademark) disk, a CD (Compact Disc), a CD-R (Compact Disc-Recordable), a CD-ROM (Compact Disc Read Only Memory), a DVD (Digital Versatile Disc), an SD memory card (SD memory card), a USB memory (Universal Serial Bus memory) or the like.

The program executed by the magnetic ink character recognition apparatus 1 of the above embodiment may be provided by being stored on a computer connected to a network such as the Internet and then downloaded via a network or the like.

What is claimed is:

1. A magnetic ink character recognition apparatus, comprising:
    a magnetic head;
    a conveyance module configured to convey a medium on which a magnetic ink character is printed with respect to the magnetic head;
    an acquisition module configured to acquire a magnetic detection signal of the medium read by the magnetic head;
    an excluding module configured to exclude a predetermined exclusion section including a reading result of an end portion of the medium from a signal section of the magnetic detection signal; and
    a recognition module configured to recognize an identity of the magnetic ink character based on the magnetic detection signal of a remaining signal section except for the predetermined exclusion section; wherein
    the excluding module specifies a signal section from a first peak position of the magnetic detection signal to a position away from the first peak position by a movement distance corresponding to a time width determined according to a size in the conveyance direction of the medium and a conveyance speed of the medium, and excludes a magnetic detection signal in the exclusion section from a rear end to a tip of the signal section;
    the exclusion section is set as a predetermined time width calculated based on sizes of margin areas positioned in front and rear sides in the conveyance direction of a printing area on which the magnetic ink character is printed on the medium and the conveyance speed of the medium.

2. The magnetic ink character recognition apparatus according to claim 1, further comprising:
    a detection module configured to detect a size of the medium in the conveyance direction, wherein
    the excluding module specifies the signal section using the size detected by the detection module.

3. The magnetic ink character recognition apparatus according to claim 1, further comprising:
    a detection module configured to detect a size of the medium in the conveyance direction, wherein
    the excluding module specifies the signal section using the size detected by the detection module.

4. The magnetic ink character recognition apparatus according to claim 1, wherein
    the excluding module specifies a signal section from the first peak position of the magnetic detection signal to a position away from the first peak position by a movement distance corresponding to a time length determined according to a size in the conveyance direction of a printing area on which the magnetic ink character is printed on the medium and the conveyance speed of the medium, and
    the recognition module recognizes the identity of the magnetic ink character based on the magnetic detection signal in the specified signal section.

5. The magnetic ink character recognition apparatus according to claim 1, wherein
    the medium is a check or promissory note.

6. The magnetic ink character recognition apparatus according to claim 1, wherein
    the excluding module is configured to remove end noise from the magnetic detection signal.

7. A magnetic ink character recognition method, comprising:
    conveying a medium on which a magnetic ink character is printed with respect to a magnetic head
    acquiring a magnetic detection signal of the medium read by the magnetic head;
    excluding a predetermined exclusion section including a reading result of an end portion of the medium from a signal section of the magnetic detection signal; and
    recognizing an identity of the magnetic ink character based on the magnetic detection signal of a remaining signal section except for the predetermined exclusion section; further comprising:
    specifying a signal section from a first peak position of the magnetic detection signal to a position away from the first peak position by a movement distance corresponding to a time width determined according to a size in the conveyance direction of the medium and a conveyance speed of the medium, and excluding a magnetic detection signal in the exclusion section from a rear end to a tip of the signal section;
    setting as a predetermined time width calculated based on sizes of margin areas positioned in front and rear sides in the conveyance direction of a printing area on which the magnetic ink character is printed on the medium and the conveyance speed of the medium.

8. The magnetic ink character recognition method according to claim 7, further comprising:
detecting a size of the medium in the conveyance direction; and
specifying the signal section using the size detected.

9. The magnetic ink character recognition method according to claim 7, further comprising:
detecting a size of the medium in the conveyance direction; and
specifying the signal section using the size detected.

10. The magnetic ink character recognition method according to claim 7, further comprising:
specifying a signal section from the first peak position of the magnetic detection signal to a position away from the first peak position by a movement distance corresponding to a time length determined according to a size in the conveyance direction of a printing area on which the magnetic ink character is printed on the medium and the conveyance speed of the medium; and
recognizing the identity of the magnetic ink character based on the magnetic detection signal in the specified signal section.

11. The magnetic ink character recognition method according to claim 7, wherein
the medium is a check or promissory note.

12. The magnetic ink character recognition method according to claim 7, further comprising:
removing end noise from the magnetic detection signal.

13. A check reading device, comprising:
a magnetic head;
a conveyance module configured to convey a check on which a magnetic ink character is printed with respect to the magnetic head;
an acquisition module configured to acquire a magnetic detection signal of the check read by the magnetic head;
an excluding module configured to exclude a predetermined exclusion section including a reading result of an end portion of the check from a signal section of the magnetic detection signal; and
a recognition module configured to recognize an identity of the magnetic ink character based on the magnetic detection signal of a remaining signal section except for the predetermined exclusion section;
wherein the excluding module specifies a signal section from a first peak position of the magnetic detection signal to a position away from the first peak position by a movement distance corresponding to a time width determined according to a size in the conveyance direction of the medium and a conveyance speed of the check, and excludes a magnetic detection signal in the exclusion section from a rear end to a tip of the signal section;
wherein the exclusion section is set as a predetermined time width calculated based on sizes of margin areas positioned in front and rear sides in the conveyance direction of a printing area on which the magnetic ink character is printed on the check and the conveyance speed of the check.

14. The check reading device according to claim 13, further comprising:
a detection module configured to detect a size of the check in the conveyance direction, wherein
the excluding module specifies the signal section using the size detected by the detection module.

* * * * *